Patented Sept. 22, 1942

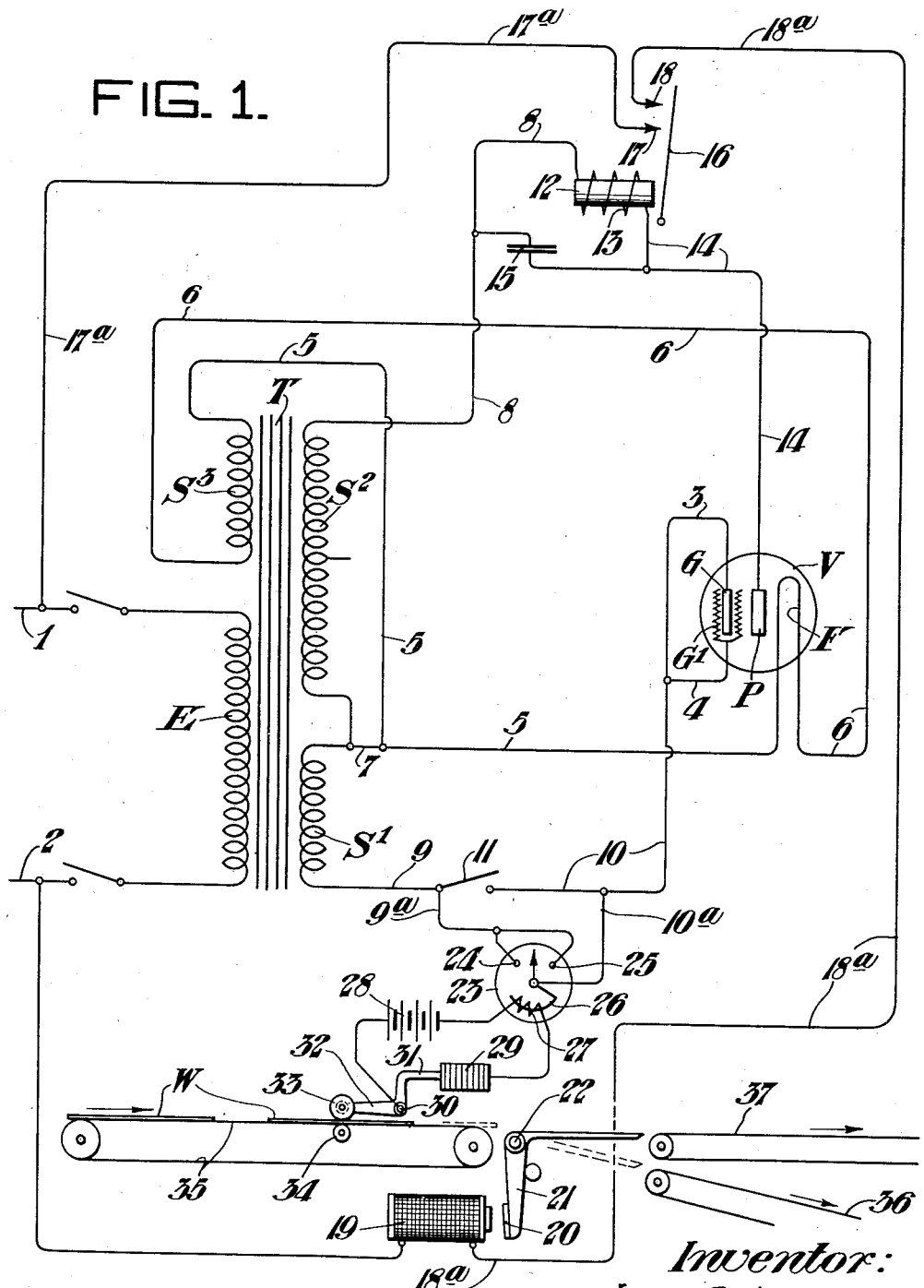

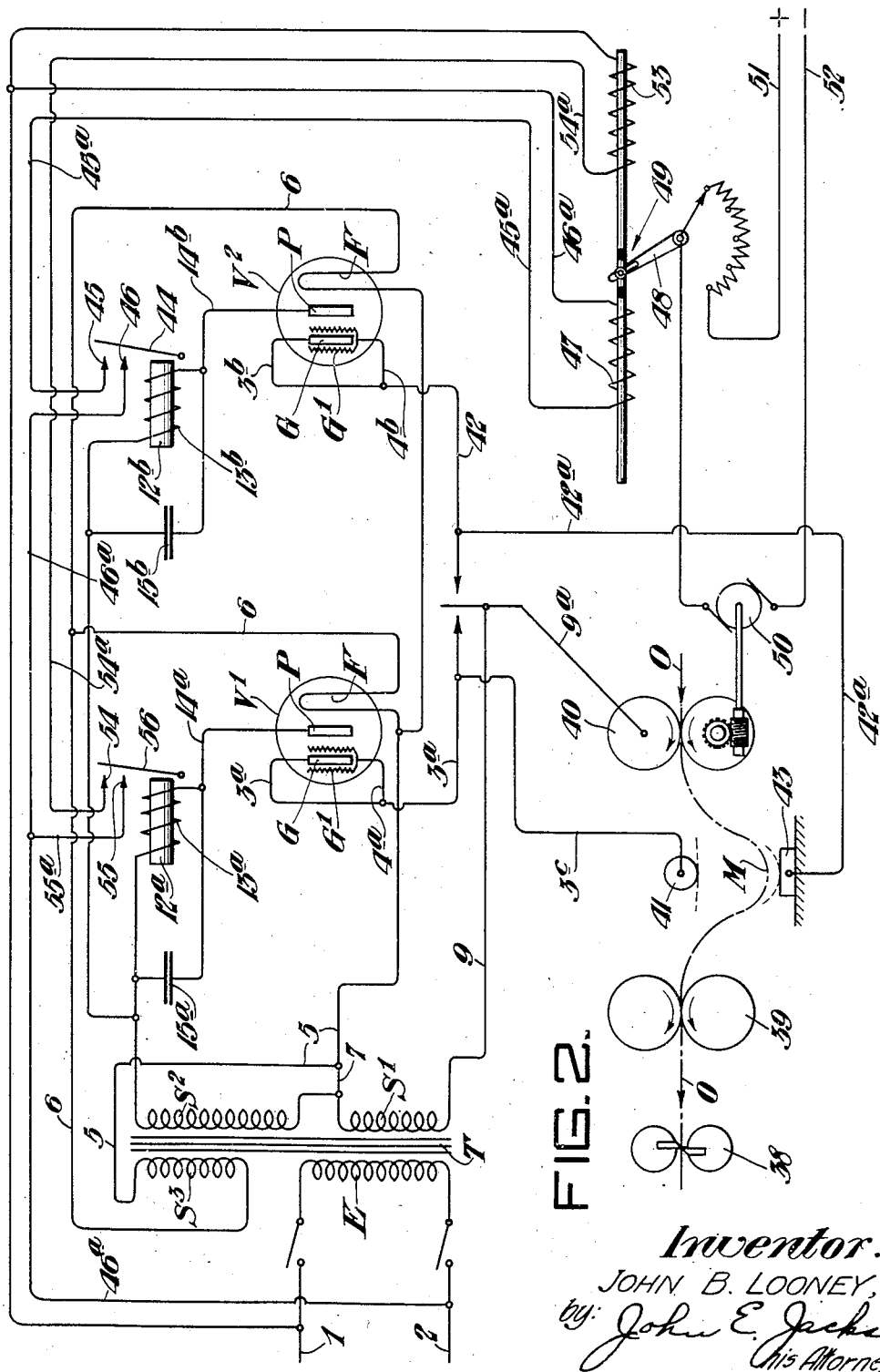

2,296,719

UNITED STATES PATENT OFFICE 2,296,719

CIRCUIT CONTROL APPARATUS

John B. Looney, Birmingham, Ala.

Original application September 30, 1940, Serial No. 359,176. Divided and this application September 9, 1941, Serial No. 410,227

1 Claim. (Cl. 164—68)

The present invention is a division of patent application, Serial No. 359,176, filed September 30, 1940, and relates to improvements in circuit control apparatus involving the use of a conventional type of vacuum tube and a relay so connected in circuit therewith that a very small or feeble current can control a comparatively larger strong current. In its more detailed aspects the invention relates to a combination of interrelated mechanisms and circuit arrangements for controlling the feed rolls of a strip feeding device in response to predetermined deflections of a looped portion thereof. The above and further features of the invention will be fully apparent from the following detailed disclosure, the accompanying drawings, and the appended claim.

In the drawings:

Figure 1 is a diagrammatic view of coacting instrumentalities and control circuits therefor, illustrating one embodiment of the invention; and Figure 2 is a similar diagrammatic view illustrating another combination of coacting instrumentalities and circuit control means therefor, embodying the invention.

Referring first to the embodiment of the invention illustrated in Figure 1, 1 and 2 represent the feed wires carrying 110-volt alternating current which excites the primary winding E of a transformer indicated generally at T. The secondary of this transformer includes secondary windings $S^1$, $S^2$ and $S^3$. A conventional type of vacuum tube V having a filament F, control grid G, screen grid $G^1$ and plate P has said grid and plate elements so connected to the transformer secondary that there is no flow of current in the plate circuit when the voltage on the grid is zero. The control grid G and screen grid $G^1$ are connected together by leads 3 and 4 as shown, thereby increasing the capacity of the grid circuit. Voltage is supplied to the filament F through leads 5 and 6 and to the plate through leads 7 and 8, and to the grid through leads 9 and 10. The circuit is adapted to be automatically closed across the gap 11 in a manner to be hereafter described. The voltage on the grid is alternating, making it unnecessary to provide a rectifier as customarily required. A relay 12 includes an electromagnetic coil 13 which is connected by wires 8 and 14 in series with the plate circuit. A condenser 15 is connected across the leads 8 and 14 to stabilize the voltage.

When the circuit is closed at 11, a voltage is applied to the grid and thus current flows through the plate circuit. Thus the coil 13 of the relay is energized, thus attracting the armature 16 thereof which is effective to close a circuit across the contacts 17 and 18. The latter are connected to leads 17a and 18a, which are in circuit with the feed wires 1 and 2, respectively. Connected in series in the circuit 17a and 18a there is an electromagnet 19 which, when the armature 16 closes the circuit across the points 17 and 18, is energized and thus attracts the armature 20 of a deflector member 21 pivoted at 22.

The numeral 23 represents as a whole a mechanism capable of closing the circuit through the leads 9 and 10 across the gap 11. In the embodiment of the invention shown in Figure 1, the element 23 takes the form of an ammeter. It is equipped with adjustably mounted contact points 24 and 25, both of which are connected by a lead 9a with the lead 9. A pivotally mounted member 26, corresponding to the pointer of the ammeter, is connected by a lead 10a with the lead 10, the arrangement being such that when the member 26 strikes either contact 24 or 25, the grid circuit will be closed across the gap 11. The member 26 may be actuated, for example, by a coil 27 connected in series with a source of current indicated at 28 and with a carbon pile regulator 29, or any other suitable current varying device. As illustrated, the carbon pile or other current regulating device is acted upon by a micrometer caliper which, as diagrammatically shown, includes a bell crank pivoted at 30 and having one portion 31 pressing against the carbon pile and another portion 32 carrying a micrometer caliper roller 33 positioned above an idle backing roller 34. As thus arranged, so long as the gauge or thickness of sheets W carried forward by the conveyor 35 does not vary between predetermined limits, the grid circuit will remain open at the gap 11. However, any variation in gauge will be reflected in the movement of the micrometer caliper roller 33 which, in turn, will vary the pressure on the carbon pile regulator 29, and thus alter the resistance and, therefore, the strength of current flowing through the coil 27. As a result of such current variation, the member 26 will make a contact at 24 when an over-gauge sheet passes the micrometer roller, thus causing current to flow in the plate circuit, whereupon the relay coil 13 will be energized so as to close the grid circuit across contacts 17 and 18, and thereby rock the deflector 21, so that the off-gauge sheet will be guided to the off-gauge conveyor 36. Similarly, if the sheet is under predetermined gauge, contact will be made by member 26 at the point 25 again energizing the coil 13 and actuating the deflector through the energization of the magnet 19. When sheets of normal desired gauge are fed by the conveyor, the deflector 22 remains in the full-line position shown and the sheets carried away on the conveyor 37 to a suitable storage point.

By utilization of the vacuum tube controlled relay described, the relatively heavy current required to actuate the deflector magnet 19 is controlled by means of a relatively feeble current flowing in the plate circuit, which circuit is controlled by the grid potential. Heretofore it has frequently happened that the means of closing the circuit across points 9 and 10 is of such delicate construction that it is impractical or impossible to use contacts of a size sufficient to carry any appreciable amount of current. Utilization of the combination of coacting instrumentalities and circuit connections shown in Figure 1 makes it unnecessary to employ any appreciable strength of current flow through the circuit closing means, since the closing of the circuit in the arrangement illustrated merely applies voltage to the grid of the vacuum tube with a very feeble current flow.

Figure 2 illustrates the invention as applied to means for automatically controlling the amount of slack M in a length of continuous strip O which is adapted to be cut by the rotating blades of a flying shear 38. The strip is fed to the shear by spaced pairs of coacting rolls 39 and 40 and the amount of slack M between these spaced pairs of rolls is automatically controlled in a manner to be presently described. It is necessary to maintain the slack in the strip between the two pairs of rolls 39 and 40 within definite limits in order to insure proper operation of the flying shear 38. In this embodiment of the invention, the relays 13a and 13b illustrated are substantially the same as the relay 13 of Figure 1 and they are located in substantially the same circuits as shown except that a single transformer supplies power to both relays. The vacuum tubes $V^1$ and $V^2$ are also substantially the same as that shown at V in Figure 1. However, in Figure 2 the lead 3a from the grid circuit is connected by lead 3c with an aluminum roller or other contact device 41 adapted to coact with the strip when the amount of slack M becomes insufficient. The lead 9 from the secondary winding $S^1$ of the transformer is connected by a wire 9a with one of the feed rollers 40, or to the housing thereof. A lead 42 in the grid circuit of vacuum tube $V^2$ is connected by a wire 42a with a block or other contact-making device 43 adapted to coact with the slack portion of the strip in a manner to be presently described. When the slack or the loop M becomes too great, the strip comes in contact with the block 43, closing the circuit of leads 9 and 42. This energizes the grid circuit and causes a current to flow in the plate circuit of the vacuum tube $V^1$, thus energizing the relay coil 13b and attracting the armature 44. This closes the circuit across the contacts 45 and 46 of wires 45a and 46a, thus completing a circuit from the feed wires 1 and 2 through an actuating coil 47. Energization of the coil 47 shifts the arm 48 of a controller 49 to such position that current supplied to the motor 50 drives it at a relatively slow speed. The motor is in circuit with wires 51 and 52 leading to a suitable source of electrical energy.

To speed up the motor 50 the coil 53 is effective to shift the controller arm 48 in contrary direction to that imparted by the coil 47. The coil 53 is in a circuit including contacts 54 and 55 adapted to be closed by an armature 56 upon energization of the relay coil 13a so as to thus close the circuit via lead wires 54a and 55a to the feed wires 1 and 2. With the apparatus shown and described, it is apparent that when the slack between the rollers 39 and 40 becomes too small, the strip is pulled up against the roller 41, whereupon the relay 13a is effective to cause the controller coil to speed up the motor 50 and thus increase the slack. On the other hand, when the slack becomes too great, the circuit is closed through the block 43, thus energizing the other relay 13b, causing the proper controller coil to be energized to slow down the motor 50. Heretofore switches operated mechanically by the rise and fall of the strip have been tried, but they have been found unsatisfactory because they tend to mar the surface of the strip. Electric contacts have also been employed but they have been found objectionable since they have a tendency to burn the strip. By the utilization of the combination of elements illustrated and described, such feeble current passes through the strip that trouble due to burning is eliminated and marring of the strip is thus avoided.

While I have described quite specifically two alternative embodiments of the invention, it is to be understood that I am not limited thereto since the invention is applicable to many uses where it is desirable to control a relatively large electric current by means of a very small or feeble current or with merely a slight variation in voltage potential.

I claim:

In combination, a pair of vacuum tubes, each having a respective filament, grid and plate element, filament, grid and plate feeble current circuits in which said elements are connected, respective relays each having a magnetic coil energized by current flowing in the plate circuit of one of said tubes, respective armatures actuated in response to current fluctuations in said coils, a flying shear, spaced pairs of feed rolls for feeding strip thereto, means for driving said pairs of rolls so as to maintain a slack or looped portion between them, said driving means including a motor driving one pair of said rolls, a controller effective when one of said relays is energized to speed up said motor and to slow down said motor when the other of said relays is energized, and respective grid circuit closing members positioned for coaction with the said looped portion of the strip, effective to cause one or the other of said relays to be energized upon contact of the strip with said grid circuit closing members.

JOHN B. LOONEY.